US008645695B2

(12) United States Patent
Buckley et al.

(10) Patent No.: US 8,645,695 B2
(45) Date of Patent: Feb. 4, 2014

(54) SYSTEM AND METHOD FOR MANAGING SECURITY KEY ARCHITECTURE IN MULTIPLE SECURITY CONTEXTS OF A NETWORK ENVIRONMENT

(75) Inventors: Adrian Buckley, Tracy, CA (US); Mariyuran Wijayanathan, Waterloo (CA); Chen-Ho Chin, Deerlijk (BE)

(73) Assignee: BlackBerry Limited, Waterloo (CA)

( * ) Notice: Subject to any disclaimer, the term of this patent is extended or adjusted under 35 U.S.C. 154(b) by 222 days.

(21) Appl. No.: 12/898,187

(22) Filed: Oct. 5, 2010

(65) Prior Publication Data

US 2011/0246777 A1    Oct. 6, 2011

(30) Foreign Application Priority Data

Oct. 7, 2009  (WO) .................. PCT/US2009/05988

(51) Int. Cl.
*H04K 1/02* (2006.01)
(52) U.S. Cl.
USPC ........................................... 713/172; 380/247
(58) Field of Classification Search
USPC .......... 713/171, 172, 173, 174; 380/247, 248, 380/238
See application file for complete search history.

(56) References Cited

U.S. PATENT DOCUMENTS

| 6,367,014 | B1* | 4/2002 | Proust et al. ................... 713/182 |
| 6,915,124 | B1* | 7/2005 | Kiessling et al. .............. 455/411 |
| 6,931,528 | B1* | 8/2005 | Immonen ...................... 713/151 |
| 8,027,666 | B2* | 9/2011 | Xie et al. ...................... 455/411 |
| 8,032,180 | B2* | 10/2011 | Choi .............................. 455/557 |
| 8,306,531 | B2* | 11/2012 | Zhu et al. .................... 455/435.1 |
| 2004/0228491 | A1* | 11/2004 | Wu ................................ 380/272 |
| 2005/0148366 | A1* | 7/2005 | Okada ........................... 455/558 |
| 2005/0232428 | A1* | 10/2005 | Little et al. ..................... 380/277 |
| 2005/0266886 | A1* | 12/2005 | Chan ............................. 455/558 |
| 2006/0040661 | A1* | 2/2006 | Choi et al. ................. 455/432.3 |
| 2008/0064369 | A1* | 3/2008 | Xie et al. ...................... 455/411 |
| 2009/0093249 | A1* | 4/2009 | Zhu et al. ...................... 455/433 |
| 2009/0270099 | A1* | 10/2009 | Gallagher et al. .......... 455/435.1 |
| 2010/0069119 | A1* | 3/2010 | Mueck et al. ................. 455/561 |
| 2011/0093919 | A1* | 4/2011 | Naslund et al. .................... 726/3 |

FOREIGN PATENT DOCUMENTS

| WO | WO 03/088053 | * 10/2003 |
| WO | 2007102702 | * 9/2007 |
| WO | 2008023162 | 2/2008 |
| WO | WO 2008/023162 | * 2/2008 |
| WO | 2011043772 | 4/2011 |

OTHER PUBLICATIONS

EPO, Search Report and Written Opinion, Application No. PCT/US2009/059886, Jul. 16, 2010, 16 pgs.

(Continued)

*Primary Examiner* — Kambiz Zand
*Assistant Examiner* — Abu Sholeman
(74) *Attorney, Agent, or Firm* — The Danamraj Law Group, P.C.

(57) ABSTRACT

A user equipment (UE) device that is able to engage in multiple security contexts contains a key generator to generate one or more authentication keys for authentication of the UE device in a particular security context and a component configured to facilitate storing of the authentication keys in a subscriber identity module (SIM) if an elementary file (EF) structure for the particular security context is available in the SIM and to facilitate storing of the authentication keys in a nonvolatile memory (NVM) of the UE device if the EF structure is not found in the SIM.

28 Claims, 17 Drawing Sheets

(56) References Cited

OTHER PUBLICATIONS

VODAFONE, Single Radio Voice Call Continuity, 3 GPP Draft, TSG SA WG2, Document No. S2-063159, Aug. 22, 2006, 8 pgs.
3GPP, 3RD Generation Partnership Project, Technical Specification Group Core Network and Terminals; Characteristics of the Universal Subscriber Identity Module (USIM) Application, Release 8 3GPP Draft, TS 31.102, Mar. 23, 2009, 172 pgs.
3GPP Standard, 3rd Generation Partnership Project, Technical Specification Group Services and System Aspects, 3G Security; Security Architecture (Release), 3GPP TS 33.102, V9.0.0, Sep. 1, 2009, pp. 1-70.
EPO, EPO Communication Pursuant to Rules 161(1) and 162 EPC, Application No. 09740223.4, May 15, 2012, 2 pgs.
PCT, Notice of International Search Report and Written Opinion, Application No. PCT/US2009/059886, Apr. 19, 2012, 16 pgs.
CIPO, Office Action, Application No. 2,716,291, Feb. 25, 2013, 2 pgs.
Hong Kong IPD, Gazette and Register Entry of Publication, Application No. 13101798.7, Jun. 14, 2013, 4 pgs.

* cited by examiner

EF_UST

| Identifier: '6F38' | | Structure: transparent | | Mandatory |
|---|---|---|---|---|
| SFI: '04' | | | | |
| File size: X bytes, (X≥1) | | | Update activity: low | |
| Access Conditions:<br>READ         PIN<br>UPDATE     ADM<br>DEACTIVATE  ADM<br>ACTIVATE   ADM | | | | |
| Bytes | Description | | M/O | Length |
| 1 | Services n°1 to n°8 | | M | 1 byte |
| 2 | Services n°9 to n°16 | | O | 1 byte |
| 3 | Services n°17 to n°24 | | O | 1 byte |
| 4 | Services n°25 to n°32 | | O | 1 byte |
| etc. | | | | |
| X | Services n°(8x-7) to n°(8x) | | O | 1 byte |

FIG. 9

ATTACH ACCEPT message content 1100A

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 2-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.2 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency Number List | Emergency Number List 9.9.3.37 | O | TLV | 5-50 |

LOCATION UPDATING ACCEPT message content 1100B

| IEI | Information Element | Type/Reference | Presence | Format | Length |
|---|---|---|---|---|---|
| | Mobility management protocol discriminator | Protocol discriminator 10.2 | M | V | 1/2 |
| | Skip Indicator | Skip Indicator 10.3.1 | M | V | 1/2 |
| | Location Updating Accepting message type | Message type 10.4 | M | V | 1 |
| | Location area identification | Location area identification 10.5.1.3 | M | V | 5 |
| 17 | Mobile identity | Mobile identity 10.5.1.4 | O | TLV | 3-10 |
| A1 | Follow on proceed | Follow on proceed 10.5.3.7 | O | T | 1 |
| A2 | CTS permission | CTS permission 9.9.3.33 | O | T | 1 |
| 4A | Equivalent PLMNs | PLMN list 10.5.1.13 | O | TLV | 5-47 |
| 34 | Emergency Number List | Emergency Number List 10.5.3.13 | O | TLV | 5-50 |

SYSTEM AND METHOD FOR MANAGING SECURITY KEY ARCHITECTURE IN MULTIPLE SECURITY CONTEXTS OF A NETWORK ENVIRONMENT

REFERENCE TO RELATED APPLICATION(S) AND CLAIM OF PRIORITY

Pursuant to 35 U.S.C. §365(a) and 35 U.S.C. §119(a)-(d), this application is based upon and claims the benefit of priority from the prior International Application No. PCT/US2009/059886, filed on Oct. 7, 2009, the entire contents of which is incorporated herein by reference.

This application discloses subject matter that is related to the subject matter of the following commonly assigned U.S. patent application(s): (i) "NETWORK SELECTION INVOLVING GANC REDIRECTION", application Ser. No. 11/287,638, filed on Nov. 28, 2005; (ii) "SYSTEM AND METHOD FOR PROVIDING OPERATOR-DIFFERENTIATED MESSAGING TO A WIRELESS USER EQUIPMENT (UE) DEVICE", application Ser. No. 11/287,857, filed on Nov. 28, 2005; and (iii) "SYSTEM AND METHOD FOR SUPPORTING GAN SERVICE REQUEST CAPABILITY IN A WIRELESS USER EQUIPMENT (UE) DEVICE" application Ser. No. 11/287,637, filed on Nov. 28, 2005; each of which is hereby incorporated by reference.

FIELD OF THE DISCLOSURE

The present patent disclosure generally relates to telecommunications networks. More particularly, and not by way of any limitation, the present patent disclosure is directed to a system and method for managing security key architecture in multiple security contexts of a wireless user equipment (UE) device in a network environment.

BACKGROUND

With the quickly rising use of mobile telecommunication networks for broadband Internet access, network operators and telecommunication equipment vendors are poised to adopt a next generation standard referred to as LTE or Long Term Evolution. LTE is a project of the $3^{rd}$ Generation Partnership Project (3GPP) and offers an upgrade path for all major current wireless network technologies. Based on the Internet Protocol (IP), it leverages the flexibility of packet switching while offering the ability to continue to use the existing infrastructure for providing legacy circuit-switched (CS) services. While such developments are undoubtedly advantageous, certain lacunae emerge where a UE device is required to negotiate multiple authentication procedures.

BRIEF DESCRIPTION OF THE DRAWINGS

A more complete understanding of the embodiments of the present patent disclosure may be had by reference to the following Detailed Description when taken in conjunction with the accompanying drawings wherein:

FIG. 9 depicts an example elementary file (EF) structure according to an embodiment of the present disclosure;

FIGS. 11A and 11B depict example message structures in two different access technologies wherein identical information regarding certain data is transmitted;

DETAILED DESCRIPTION OF THE DRAWINGS

The present patent disclosure is broadly directed to a scheme for managing security key architecture in a network environment where a UE device can engage in multiple security contexts depending on the access technology. In one embodiment, a multiple security context management method for use with a mobile equipment is disclosed. The claimed embodiment comprises one or more of the following features and not limited to: engaging in a first security context with a first network; receiving a first challenge from the first network pursuant to the first security context; requesting a removable memory such as, e.g., a subscriber identity module or (U)(SIM), for generating a first set of authentication vectors with respect to the first security context; receiving the first set of authentication vectors and storing them in a first location; engaging in a second security context with a second network; receiving a second challenge from the second network pursuant to the second security context; requesting the removable subscriber identity module for generating a second set of authentication vectors with respect to the security context; receiving the second set of authentication vectors; determining if the second set of authentication vectors would be stored in the same location as the first location where the first set of authentication vectors have been stored; storing the second set of authentication vectors in a second location; receiving a security mode command message from a network node coupled to the second network; and determining that the second set of authentication vectors should be used instead of the first set of authentication vectors for handover from the first network to the second network.

In another embodiment, also disclosed herein is mobile equipment, comprising a processor configured to control at least one of a plurality of sub-systems to perform or effectuate the foregoing operations or acts of a multiple security context management method.

In a still further embodiment, a UE device is disclosed which comprises one or more of the following and is not limited to: a key generator adapted to generate one or more authentication keys for authentication of the UE device in a particular security context with a network node; and a component configured to facilitate storing of the authentication keys in a removable memory module such as a subscriber identity module (U)(SIM) if an elementary file (EF) for the particular security context is available in the (U)SIM. The component is further configured to facilitate storing of the authentication keys in a nonvolatile memory (NVM) of the UE device if the elementary file is not found in the SIM.

Figure 1:
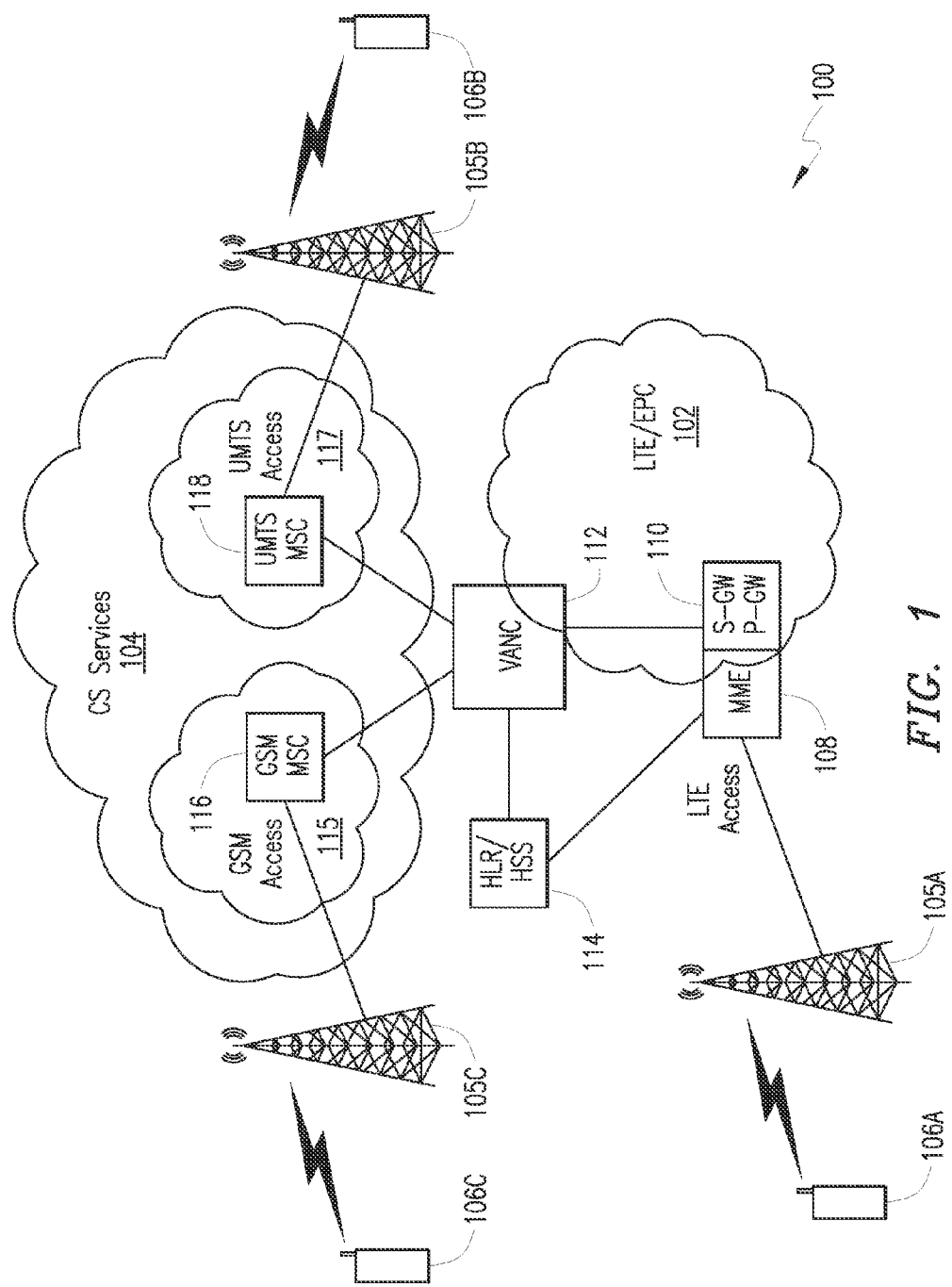
FIG. 1 depicts an example network environment including an LTE network as well as CS networks wherein an embodiment of the present patent application may be practiced.

A system and method, as well as one or more embodiments of associated device, computer-accessible media, and/or network node, of the present patent disclosure will now be described with reference to various examples of how the embodiments can best be made and used. Like reference numerals are used throughout the description and several views of the drawings to indicate like or corresponding parts to the extent feasible, wherein the various elements may not necessarily be drawn to scale. Referring now to the drawings, and more particularly to FIG. 1, depicted therein is an exemplary network environment 100 wherein an embodiment of the present patent application may be practiced for purposes of authentication key generation and storage management, inter alia, in multiple security contexts. As illustrated, the network environment 100 comprises a Long Term Evolution (LTE) network including an Evolved/Enhanced Packet Core (EPC) 102 and associated LTE access infrastructure as exemplified by reference numeral 105A. Those skilled in the art will recognize that the LTC network could be any other radio technology including but not limited to: WiMax, CDMA200, TDMA, Wi-Fi, etc. The LTE radio access infrastructure is based on Evolved Universal Mobile Telecommunications System (UMTS) Terrestrial Radio Access Network (E-UTRAN) which includes an enhanced Node B (eNodeB; not explicitly labeled in this FIG.) that interfaces with an LTE-compliant UE device 106A. The functional elements of the LTE architecture comprise a Mobility Management Entity (MME) 108, an entity 110 operating as a serving gateway (S-GW) and a packet data network gateway (P-GW or PDN-GW), and an access network controller 112 that is adapted to facilitate interfacing between the LTE/EPC architecture 102 and one or more legacy telecommunications networks 104 (e.g., 2nd- 2.5- or 3rd Generation networks) when UE 106A is desirous of consuming existing telecommunications services hosted by such legacy networks. By way of example, legacy telecommunications infrastructure network 104 is operable to provide services such as voice, Short Messaging Service (SMS), etcetera, and is exemplified by a Global System for Mobile Communications (GSM) network 115 and a UMTS network 117. As is well known, these networks are comprised of respective infrastructures as highlighted by GSM MSC 116 and UMTS MSC 118. Further, each legacy network is accessed via its respective access infrastructure 105B or 105C. UE devices 106B and 106C are capable of accessing the legacy networks 117 and 115 using appropriate radio access technology (RAT). Those skilled in the art will recognize upon reference hereto that where a UE device is operable in multiple modes (i.e., different RATs), such a device can consume services from two or more networks using appropriate RATs for access, e.g., GSM access, UMTS access or LTE access.

In one implementation, the access network controller 112 leverages the functionality of a generic access network controller (GANC) such as, e.g., one described in greater detail in one or more of the following co-pending U.S. patent applications commonly owned by the assignee of this patent application and incorporated by reference: (i) "NETWORK SELECTION INVOLVING GANC REDIRECTION", application Ser. No. 11/287,638, filed on Nov. 28, 2005; (ii) "SYSTEM AND METHOD FOR PROVIDING OPERATOR-DIFFERENTIATED MESSAGING TO A WIRELESS USER EQUIPMENT (UE) DEVICE", application Ser. No. 11/287,857, filed on Nov. 28, 2005; and (iii) "SYSTEM AND METHOD FOR SUPPORTING GAN SERVICE REQUEST CAPABILITY IN A WIRELESS USER EQUIPMENT (UE) DEVICE" application Ser. No. 11/287,637, filed on Nov. 28, 2005. Where circuit-switched (CS) services such as, e.g., voice services are provided to an LTE UE device via LTE access, such service architecture is referred to as "Voice over LTE via Generic Access" or VoLGA and the access network controller 112 is known as VoLGA access network controller or VANC. The roots of VoLGA can be found in the 3GPP GAN specifications, which add IP-based WLAN (i.e., Wi-Fi) as an access technology to 3GPP-based networks such as GSM and UMTS. GAN requires dual-mode UE devices that have both a GSM/UMTS interface and a Wi-Fi radio interface. When such dual-mode devices detect the availability of a suitable Wi-Fi network, e.g., at home or a public hotspot, they are operable to connect to the access point and register with the GSM/UMTS core network over the Wi-Fi link and the Internet. A GAN gateway securely connects a subscriber to the infrastructure of a network operator and voice calls and other CS services such as SMS, Cell Broadcast, etc., also known as Teleservices as defined in 3GPP TS 22.003, are then securely transported between the UE device and the service nodes of the CS network.

VoLGA reuses the foregoing GAN architecture principles by replacing the WLAN access with the LTE access or another wireless IP access such as but not limited to WiMax, CDMA2000, EVDO, etc. From a UE device standpoint, the two access methodologies are basically similar because both technologies are based on IP. On the LTE side, the VANC connects to the SGW/PGW node 110 via an interface that is used for both signaling and user data traffic (i.e., the voice packets). From the LTE/EPC point of view, the VANC/network node is functionally similar to any other IP-based external node and IP packets exchanged between a UE device and the VANC are transparently transmitted through the EPC network 102. On the CS-network side, VANC 112 is connected to both GSM MSC 116 and UMTS MSC 118 via suitable interfaces. In addition, VANC 112 is also connected to a Home Location Register (HLR)/Home Subscriber Server (HSS) node 114 of the legacy network environment via suitable interfaces.

Figure 2:
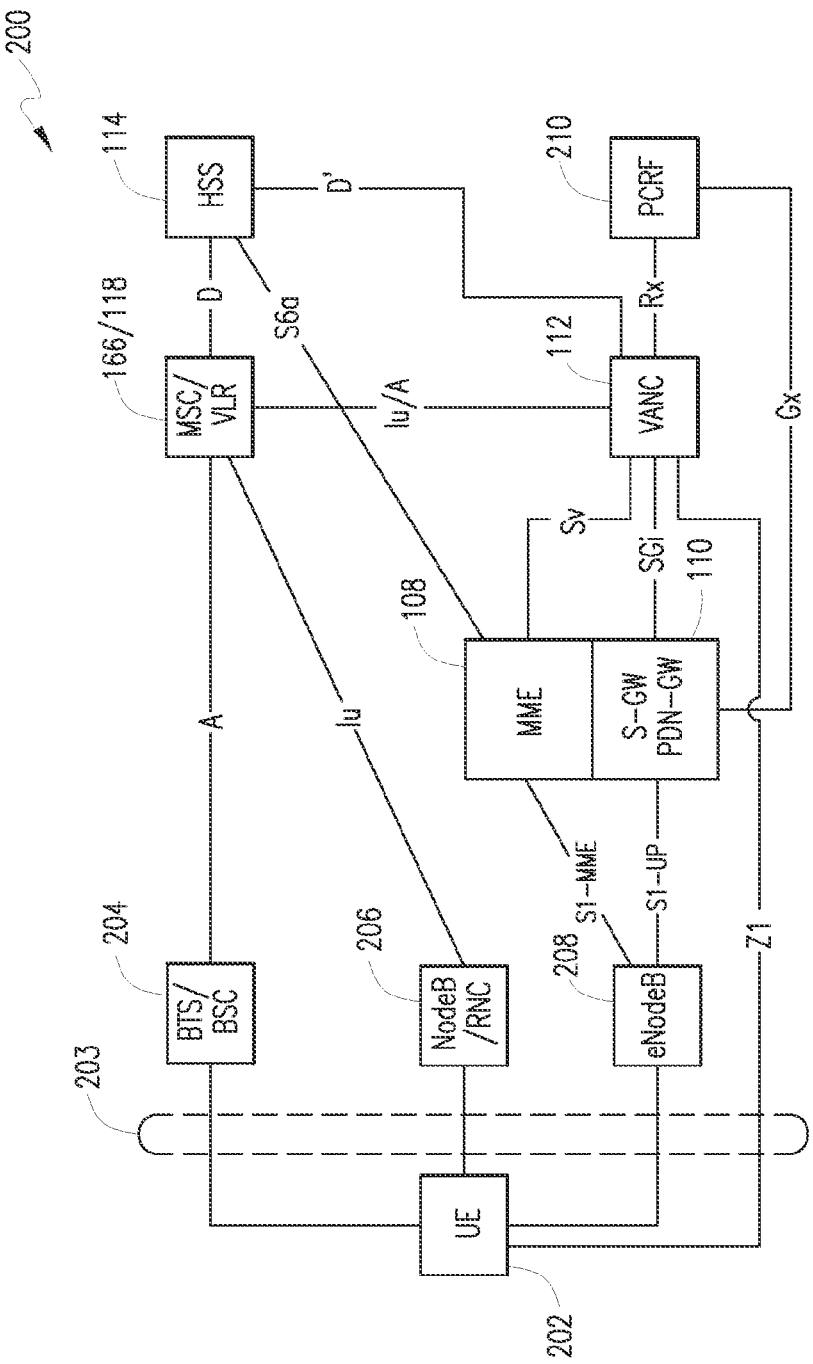
FIG. 2 depicts an example Voice over LTE via Generic Architecture (VoLGA) architecture that illustrates communication interfaces involving a UE device and various network entities.

FIG. 2 depicts an example VoLGA architecture 200 that illustrates a plurality of communication interfaces involving a UE device 202 (which can be an LTE-compliant device such as UE 106A) as well as various network entities. UE 202 is operable to be coupled to radio access network nodes in LTE/GSM/UMTS technologies using a suitable radio/air interface 203. A Base Transceiver Station/Base Station Controller (BTS/BSC) 204, a Node-B or Radio Network Controller (RNC) 206 and an evolved Node-B (eNodeB) 208 are exemplary of access network nodes in GSM, UMTS and LTE access infrastructures, respectively. BTS/BSC 204 operable to be coupled to GSM MSC/VLR 116 via A-interface and Node-B/RNC 206 is operable to be coupled to UMTS MSC/VLR 118 via Iu interface. For LTE, eNodeB 208 is operable to be coupled to MME 108 via S1-MME interface and to SGW/PGW 110 via S1-Up interface. Although MME 108 and SGW/PGW 108 are shown adjacent to each other, it should be understood the functionalities of these entities could be provided as a single node or as separate nodes in a distributed arrangement. MME 108 and SGW/PGW 110 are coupled to VANC 112 via Sv and SGi interfaces, respectively. On the CS network side, the A-interface is used to connect VANC 112 to GSM MSC 116. The Iu interface is used to connect VANC 112 to UMTS MSC 118. Functionally, the VANC/network node therefore looks like a GSM BSC to its serving MSC and like a UMTS RNC to its serving MSC. Depending on whether UE 202 is roaming, the MSCs 116/118 can be VMSC nodes; and regardless of they are VMSCs or not, the MSCs are interfaced with HLR/HSS via the D interface. As the Iu/A interfaces are used without any enhancements, the GSM/UMTS MSC nodes are not aware that LTE UE devices are not directly connected via their respective radio access networks but instead are connected over LTE access. VANC 112 may also be coupled to a Policy Charging Rule Function (PCRF) 210 via an Rx interface and to HLR/HSS 114 via a D' interface. Additional interfaces are Z1 interface between UE 202 and VANC 112 and Gx interface between SGW/PGW 110 and PCRF 210.

When UE 202 is switched on and detects an LTE network, it first registers with MME 108 over the LTE access network. The MME uses the S6a interface to HLR/HSS 114 to retrieve the subscriber data required for authenticating and managing the user. After registering with the LTE network, UE 202 then establishes a connection to the VANC. How this is done depends on VoLGA-specific configuration information that may be stored or otherwise provisioned in the UE device. First, a suitable IP connection needs to be in place. In the home network, a default bearer may be used. On the other hand, it is also possible to use a separate bearer and IP address for connection purposes. The host name or IP address of the VANC can be pre-provisioned in the UE device or can be acquired by querying a Dynamic Host Configuration Protocol (DHCP) server in the network over the IP bearer path previously established. Once the IP address of VANC 112 is known, UE 202 establishes a secure tunnel (referred to as IP Security or IPSec tunnel) over the LTE radio network through the LTE core and via the SGi interface. VANC authenticates the user based on the relevant authentication information stored in HLR/HSS 114, which is accessed over the D' interface. Additionally, with respect to consuming CS services, e.g., Teleservices, UE 202 registers with the GSM or UMTS MSC through the secure tunnel and VANC 112 using traditional 3GPP TS 24.008 procedures.

Based on the foregoing discussion, it should be appreciated that a UE device in VoLGA architecture needs to authenticate with the network environment a number of times before service is granted. For instance, the UE is first authenticated with LTE/MME, then with the VANC and then with the MSC. In the context of authentication, when a UE device wants to access a network, in general a number of security operations need to be executed so as to: (i) allow access to the system, and (ii) protect subscribers' confidentiality in terms of their identify and the data they want to send. Typically, the UE device provides some form of identity to the network system, whereupon the system obtains some authentication vectors with which to challenge the UE pursuant to a challenge-response protocol. Depending upon the access network, e.g., LTE, WLAN, GSM/EGDE RAN (GERAN), UTRAN, etc., different mechanisms may be involved in authentication, each with its own authentication/encryption keys.

Figure 3A:
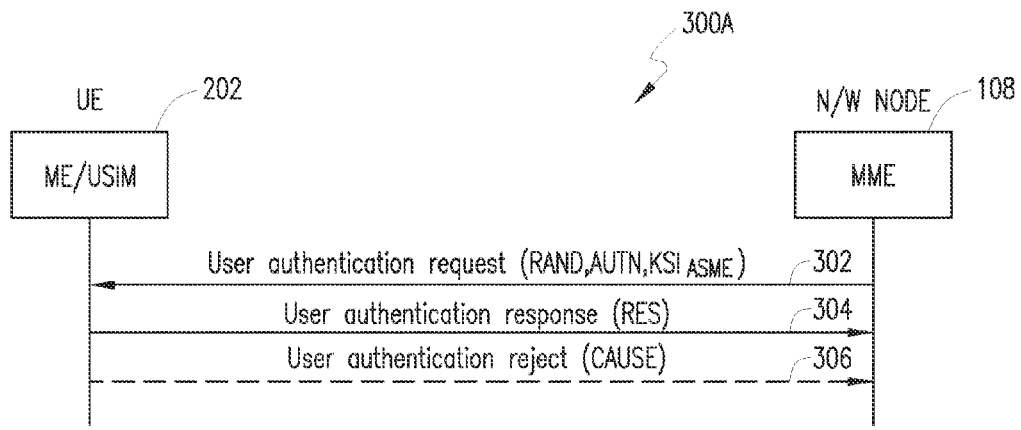
FIGS. 3A and 3B depict example message flow diagrams relating to authentication between a UE device and a network node in a particular security context.
Figure 3B:
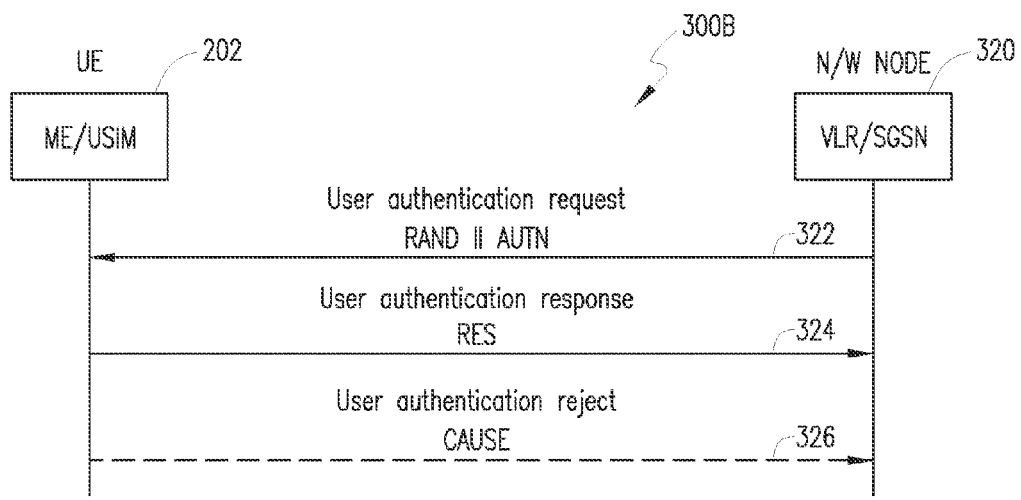

FIGS. 3A and 3B depict example message flow diagrams relating to authentication between a UE device and a network node in a particular security context. Reference numeral 300A refers to a security context relative to LTE access. LTE uses a form of UTRAN (E-UTRAN) authentication and generates a set of keys to be used for various procedures. For purposes of the present disclosure, those skilled in the art will recognize that UE 202 is comprised of a combination of a mobile equipment or ME portion and a removable smart card such as a Universal Integrated Circuit Card (UICC). In a GSM network, the UICC may contain a Subscriber Identity Module (SIM) application, while in a UMTS network the UICC may contain a Universal SIM or USIM application. Since the teachings of the present disclosure are equally applicable regardless of the type of the CS network, the terms "SIM" and "USIM" are used somewhat interchangeably.

In the LTE access context illustrated in FIG. 3A, MME 108 sends a challenge or user authentication request 302 to UE 202 that includes suitable information. Upon receipt of the user authentication request 302, the USIM generates a number of keys which will be passed to the ME portion of the device to decide where to store them within the USIM. An authentication response 304 is generated by the UE device toward MME 108. If there is a failure, a user authentication reject message 306 including a cause value may also be transmitted to MME 108. In this context, the USIM has three keys stored thereon: UTRAN Ciphering Key ($C_k$), an Integrity Key ($I_k$) and an Access Security Management Entity (ASME) Key ($K_{ASME}$). Whereas the $C_k$ and $I_k$ are stored in files on USIM that were created as part of the UTRAN standards, the $K_{ASME}$ key is created in a new file for EPC.

FIG. 3B is illustrative of an authentication context 300B in respect of GERAN/UTRAN access. As before, a suitable network node 320 (i.e., a Visitor Location Register (VLR) or a Serving GPRS Serving Node (SGSN)) sends a challenge or user authentication request 322 to UE 202 that includes suitable information. Upon receipt of the user authentication request 322, the USIM generates a number of keys which will be passed to the ME portion of the device to decide where to store them within the USIM. An authentication response 324 is generated by the UE device 202 toward network node 320. If there is a failure, a user authentication reject message 326 including a cause value may be also be transmitted to network node 320. Like before, appropriate keys such as $C_k$, $I_k$ and GSM Ciphering Key ($K_c$) are stored in the USIM.

It should be appreciated that although there may be different ways to authenticate a user based on the access type (i.e., different security contexts), some of the keys generated are common across the contexts. In VoLGA architecture, however, all the various access types are contemplated, thereby giving rise to the possibility that keys generated in one security context may overwrite or otherwise compromise the keys generated in a previous security context (i.e., key collision).

Figure 4:
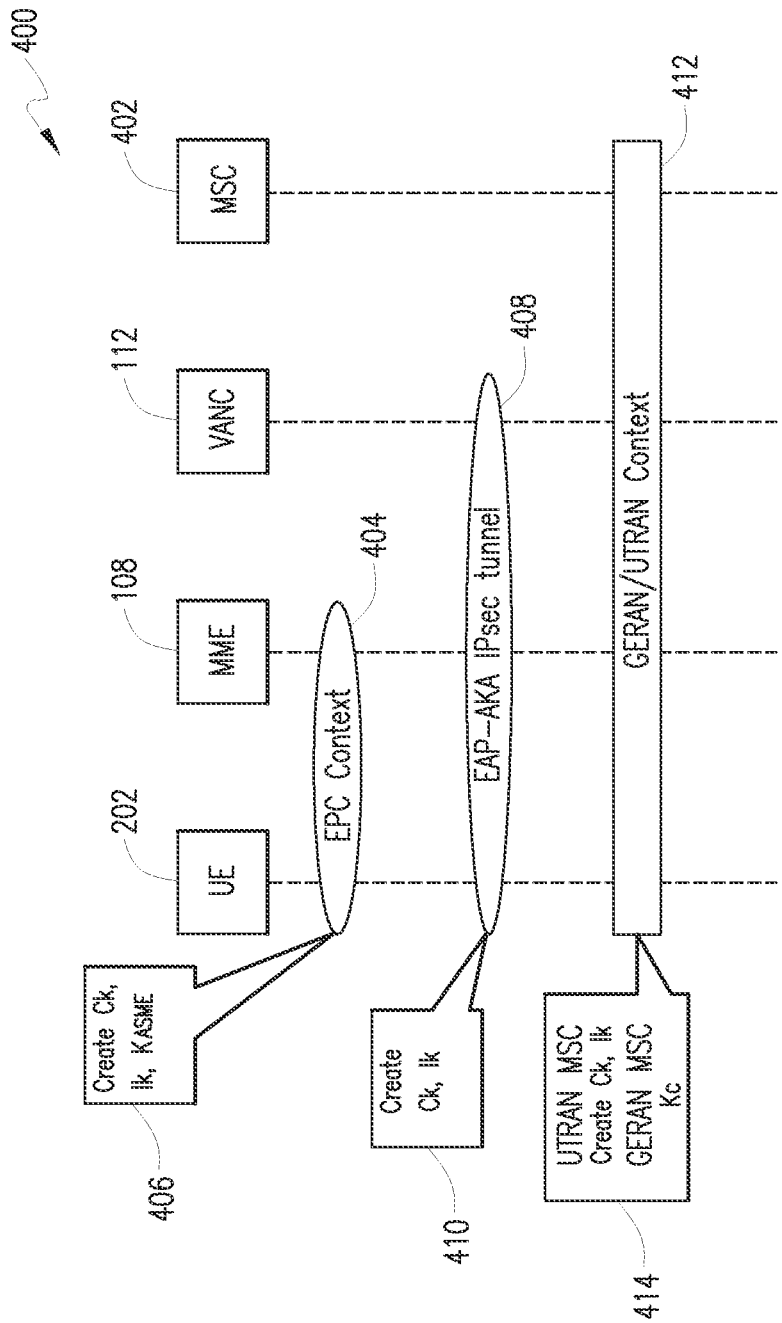
FIG. 4 depicts an example scenario with multiple security contexts in VoLGA architecture.

Referring now to FIG. 4, depicted therein is an example multiple security context scenario 400 involving multiple authentications that may be required in VoLGA architecture. A security context established between UE 202 and MME 108 is referred to as EPC context 404 which involves creation/generation, storage and management of context-specific authentication keys as shown in block 406. As described above, these keys comprise $C_k$, $I_k$ and $K_{ASME}$. With respect to establishing an IPSec Tunnel between UE 202 and VANC 108, an Extensible Authentication Protocol for Authentication and Key Assignment (EAP-AKA) as described in RFC 4187 is used for authentication and session key distribution. The security context associated with this process may be referred to as IPSec Tunnel context 408, with its own creation/ generation, storage and management of context-specific authentication keys as shown in block 410. Another security context may be established when traditional CS services are being accessed by an LTE-compliant UE device (e.g., UE 202) over LTE/EPC (i.e., legacy mode of operation through LTE RAN tunnel). As described above, such a context may be formed between UE 202 and MSC 402, which can be a GSM MSC or a UMTS MSC as described above, thereby giving rise to a GERAN security context or a UTRAN security context, respectively. These contexts are shown together as GERAN/UTRAN context 412, which involves respective key generation, storage and management processes (block 414).

It should be further appreciated that certain keys are created multiple times and if they are stored in common locations (e.g., each time $C_k$ is generated it is stored to the same $C_k$ location, or each time $I_k$ is generated it is stored to the same $I_k$ location, and so on, based on the key names or identities), there will be a number of undesirable effects such as authentication failures, service failures (e.g., handover failures), and the like. As an illustration, consider that UE 202 will always be on LTE (since it is an LTE device) and $C_k$ and $I_k$ are used to create $K_{ASME}$, which is used for a number of processes as set forth in applicable 3GPP standards. If the UE device were to engage in a UTRAN security context for some reason, the legacy UTRAN authentication procedure would create its $C_k$ and $I_k$ keys that will be stored over the LTE $C_k$ and $I_k$ keys. When the UE device performs a handover from LTE/EPC to the legacy network, the LTE keys are used in deriving the GERAN/UTRAN keys to be used by the MSC. This may create a mismatch of keys if the LTE keys were compromised after the MSC was provided with a set of keys based on an older version of the LTE keys.

Figure 5:
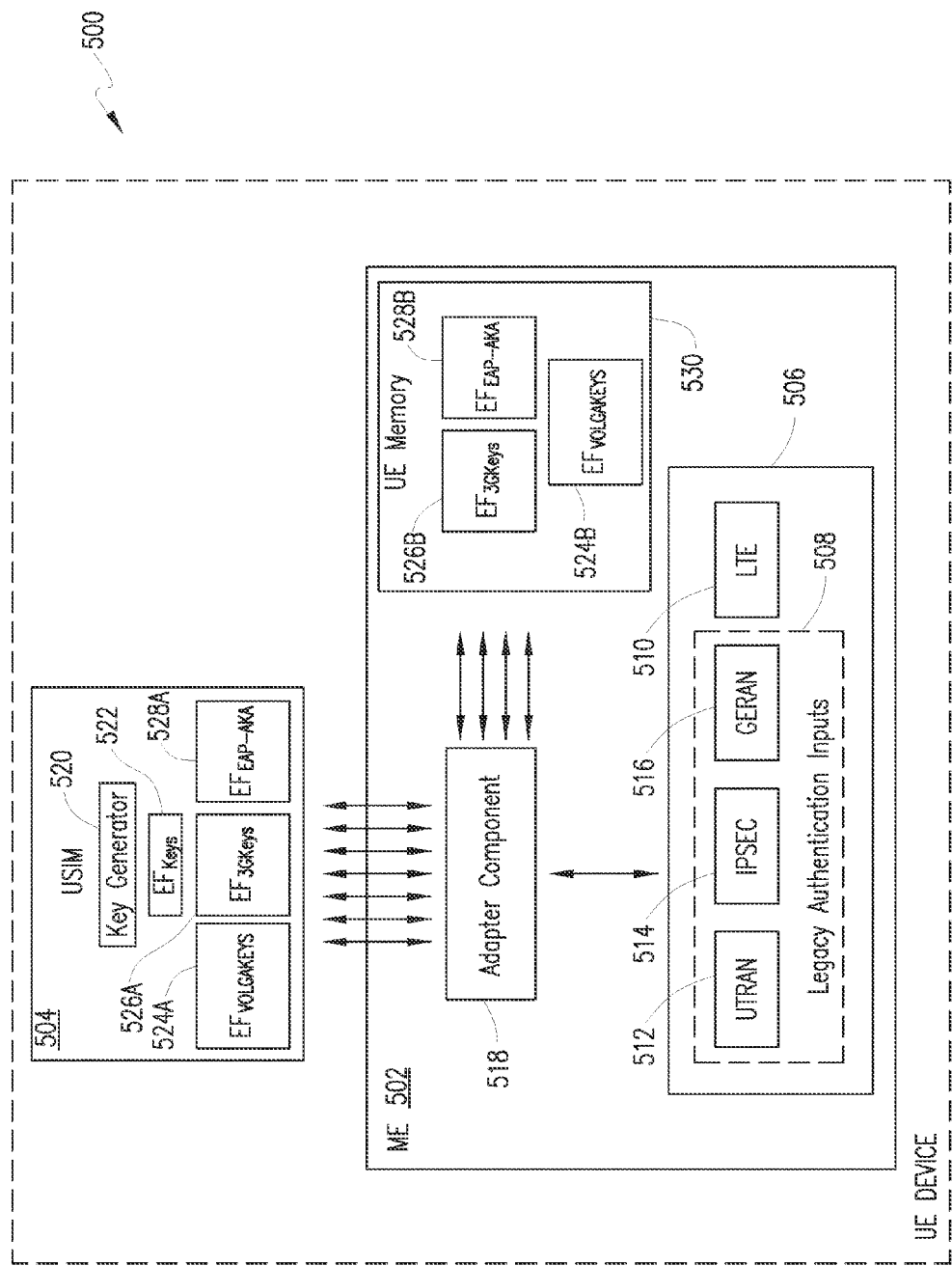
FIG. 5 depicts a block diagram of an example UE device having a mobile equipment (ME) portion and a removable subscriber identity module (SIM) according to an embodiment of the present disclosure.

FIG. 5 depicts a block diagram of an example UE device 500 having a mobile equipment (ME) portion 502 (i.e., a wireless device) and a removable USIM application 504 according to an embodiment of the present disclosure. For the sake of clarity, not all functional and structural components (e.g., processors, communication subsystems, input/output, etc.) of the UE device are shown in this block diagram. ME 502 includes an adapter component 518 for managing or otherwise mediating key generation and storage on behalf of an authentication function 506 that can accept both legacy inputs 508 such as, e.g., UTRAN input 512, IPSEC input 514 and GERAN input 516 as well as LTE authentication inputs 510. In other words, the authentication function 506 may be comprised of both legacy authentication functionality as well as non-legacy authentication functionality. In one example embodiment, USIM application 504 is provided with a key generator 520 for generating any number of authentication keys based on access types. The USIM application 504 is also provided with one or more elementary file (EF) structures that are used for facilitating storage of authentication keys under the control of the adapter block 518 as will be set forth in additional detail below. In one embodiment, USIM application 504 may include an $EF_{VOLGAKEYS}$ structure 524A that is capable of storing various keys generated pursuant to different contexts in one block that may be partitioned on a context-basis. That is, $EF_{VOLGAKEYS}$ 524A may have a first portion that is configured for storage of keys for a first security context (e.g., GERAN context), a second portion that is configured for storage of keys for a second security context (e.g., UTRAN context), a third portion that is configured for storage of keys for third second security context (e.g., LTE context), and so on. In another embodiment, USIM application 504 may have individualized EF structures that are designated for a particular security context. For instance, an $EF_{3GKEYS}$ structure 526A and/or an $EF_{EAP-AKA}$ structure 528A may be provided with respect to the corresponding security contexts. A nonvolatile memory (NVM) 530 is included in ME 502 that may be provided with one or more counterpart EF structures for key storage depending on the logic of adapter block 518 with respect to a particular context. By way of illustration, similar to the USIM application 504, an $EF_{VOLGAKEYS}$ 524B, an $EF_{3GKEYS}$ structure 526B and/or an $EF_{EAP-AKA}$ structure 528B may be provided depending on the security contexts and USIM application's status with respect to its own EF contents. Alternatively or additionally, the USIM application 504 may also be provided with a conventional EF structure, $EF_{KEYS}$ 522, for storing keys generated in certain legacy security contexts.

Figure 6:
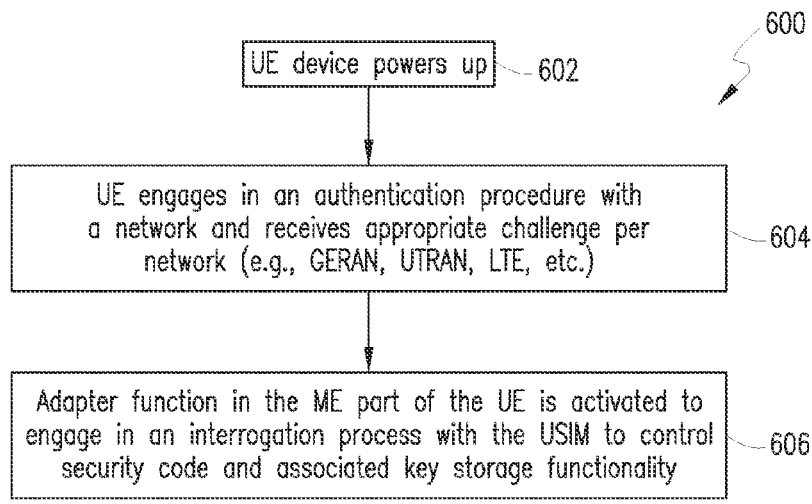
FIG. 6 depicts an example flow chart associated with an embodiment of the present disclosure.

FIG. 6 depicts an example flow chart associated with an embodiment of the present disclosure relative to a functional scheme 600 of the adapter component 518. When the UE device powers up (block 602), it is configured to discover one or more networks and engage in one or more authentication procedures with appropriate network nodes. Based on the access type of the network, suitable challenge inputs may be provided to the UE device. That is, depending on whether the access type is GERAN, UTRAN, LTE, WLAN, etc., the UE device receives suitable challenge inputs (block 604). The adapter component 518 in the ME part of the UE device is activated to engage in an interrogation process with the U/I/SIM application to control the security mode and associated key storage functionality (block 606).

Figure 7:
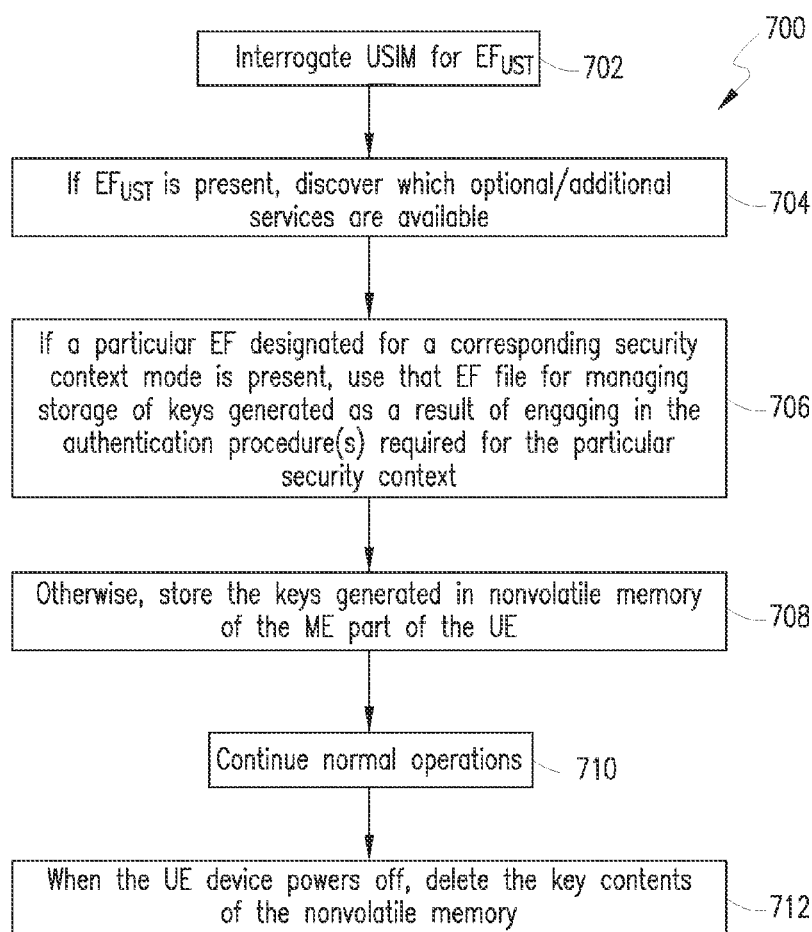
FIG. 7 depicts an example flow chart associated with another embodiment of the present disclosure.

FIG. 7 depicts an example flow chart associated with an embodiment of USIM interrogation procedure 700 of the present disclosure. When the adapter component interrogates a USIM application on the UICC, it first discovers a service table ($EF_{UST}$) that indicates which optional and/or additional services (U)SIM services/files are available (blocks 702 and 704). If an EF designated for a particular security context mode is present, the adapter component uses that EF structure for storing the keys generated as a result of engaging in the authentication procedure required for that security context (block 706). Otherwise, the generated keys are stored in the UE memory (e.g., NVM 530 in FIG. 5) in a corresponding EF structure (block 708). Thereafter, the UE devices continues operating in normal manner, e.g., completion of context-specific authentication procedures, obtaining required service(s), and so on (block 710). In one implementation, the keys may be stored as long as the UE is powered up. When the UE device powers off, the key contents of the UE memory are deleted (block 712).

Figure 8A:
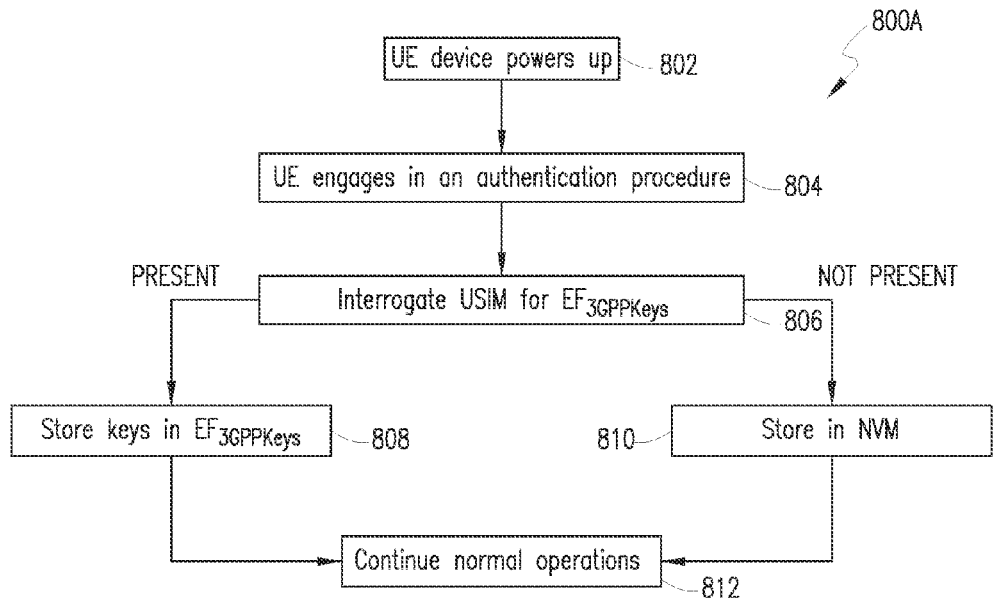
FIGS. 8A and 8B depict example flow charts associated with further embodiments of the present disclosure.
Figure 8B:
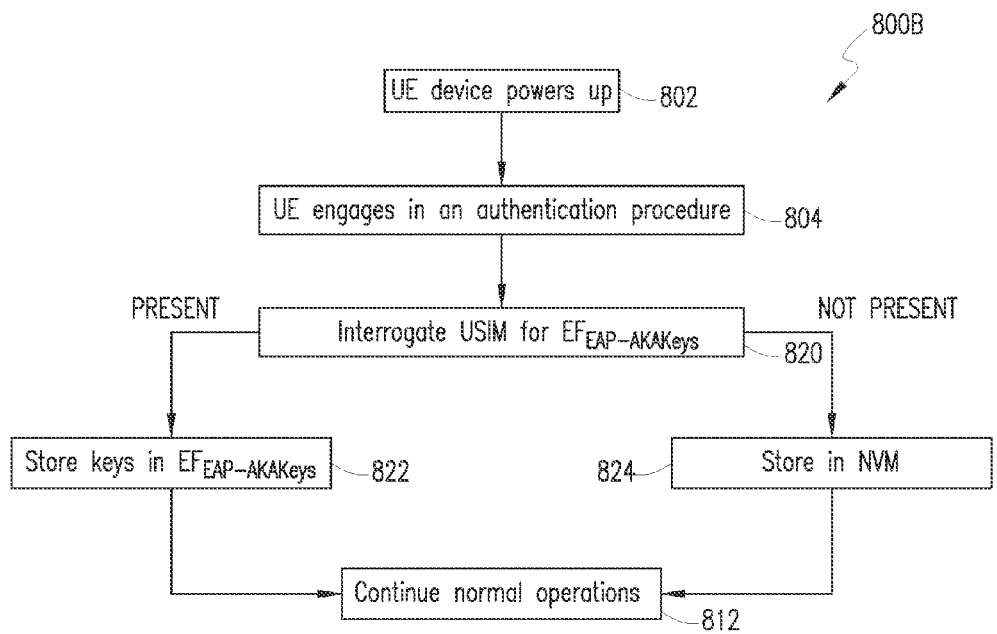

FIGS. 8A and 8B depict example flow charts associated with further embodiments of the present disclosure. Reference numeral 800A generally refers to an embodiment where the USIM application is interrogated for an EF structure relating to 3GPP keys that are generated as a result of authenticating with a 2G or 3G system via VoLGA (i.e., a GERAN/UTRAN context for example). As described previously, when the UE device is powered up (block 802), it engages in an authentication procedure based on the access network technology that is used (block 804). In a 2G/3G context, the adapter component of the UE device interrogates the USIM application of the UICC for the available services and associated service tables. If an $EF_{3GKEYS}$ (or $EF_{3GPPKEYS}$) structure is present (block 806), that structure is utilized for storing (or writing thereto) the generated authentication keys (block 808). In a further implementation, the same file structure may also be used when keys are required for encryption purposes, i.e. the adaptor component (518) reads the keys from the locations. Alternatively, if a composite file structure such as, e.g., $EF_{VOLGAKEYS}$ structure, is provided, then it may be used for storing the generated keys at a predetermined location therein with appropriate tagging to identify the particular security context. If the USIM application does not have the $EF_{3GKEYS}$ structure, either individually or in a composite file (block 806), the generated keys are stored/written in an NVM of the ME portion of the UE device (block 810). Similar to the USIM application scenario, the keys may be stored in an individual $EF_{3GKEYS}$ structure or in a composite file. Thereafter, normal telecommunications operations may continue (block 812).

FIG. 8B illustrates an embodiment 800B where the USIM application is interrogated for an EF structure relating to keys that are generated as a result of authentication pursuant to the EAP-AKA scheme. As before, when the UE device is powered up, it engages in suitable EAP-AKA procedures relative to establishing an IPSec tunnel with a network node (blocks 802 and 804). Upon appropriate authentication inputs, the adapter component of the UE device interrogates the USIM application of the UICC for the available services and associated service tables relative to the EAP-AKA process. If an $EF_{EAP-AKAKeys}$ (or simply $EF_{EAP-AKA}$) structure is present (block 820), that structure is utilized for storing the keys associated with an IPSec tunnel (block 822). Similar to the 3GPP keys discussed above, the same file structure may also be used when keys are required for encryption purposes. Additionally, if a composite file structure such as, e.g., $EF_{VOLGAKEYS}$ structure, is provided as an alternative arrangement, it may be used for storing the generated keys at a predetermined location therein with appropriate tagging to identify the particular security context (i.e., the IPSec tunnel EAP-AKA context). If the USIM application does not have the $EF_{EAP-AKA}$ structure, either individually or in a composite file (block 820), the generated keys are stored in the ME's NVM (block 824). Normal operations may then ensure (block 812).

As set forth in any of the implementations above, the keys may be stored until such time as the UE is powered off and the key contents may then be deleted from the NVM. During normal operations, if the UE performs a handover from LTE domain to UTRAN domain, the keys in the $EF_{3GKEYS}$ structure are used rather than any keys in the legacy $EF_{KEYS}$ structure. If any legacy authentication processes are supported, keys relative to such processes may be stored in the $EF_{KEYS}$ structure and the logic of the adapter component is operable to distinguish such keys and use them appropriately in order to avoid key corruption and collision. Specific handling of 2G/3G authentication vectors as well as IPSec authentication vectors is now described below.

When the UE device receives an AUTHENTICATION REQUEST message per 3GPP TS 24.008 from the network which triggers the 2G/3G authentication function in the ME (e.g., authentication function 506 shown in FIG. 5) to request new ciphering keys, the authentication function sends the request to the adapter component containing the RAND and optionally AUTN values received in the request. The adapter component then passes the authentication request that contains the RAND (and optionally AUTN) to the USIM application to obtain the ciphering keys, i.e., $K_c$ for GERAN and $C_k$ and $I_k$ for UTRAN. In one implementation, the USIM accordingly generates the keys per 3GPP TS 33.102 and passes them back to the adapter component, which in turn sends them to the authentication function. Thereafter, the authentication function performs the procedures as specified in 3GPP TS 24.008. If the authentication function requests storage of the ciphering keys, it passes them to the adapter component for making appropriate determination as to where to store/write/deposit the keys, as described in detail hereinabove.

As to retrieval of the authentication vectors, if the adapter component receives a request for the ciphering keys for 2G/3G access via VoLGA, the adapter component retrieves/reads the keys from the USIM $EF_{3GKeys}$ file if present. Otherwise, the keys are retrieved/read from the $EF_{3GKeys}$ file present in the NVM since the USIM application does not contain the necessary and/or current $EF_{3GKeys}$ file. If a request for the ciphering keys is received as a result of performing a handover from LTE to 2G/3G access, the adapter component retrieves/reads the ciphering keys from the $EF_{3GKeys}$ file and uses them as the $K_c$ and $I_k$ values for authentication and encryption in 2G/3G access.

As to IPSec authentication vectors, when the UE device receives an IKE_AUTH Response containing EAP Request and AKA Challenge message per 3GPP TS 33.234 from the network, it triggers the IPSec authentication function in the ME to request new ciphering keys. The authentication function accordingly sends the request to the adapter component which then passes the request to the USIM application 504 to obtain the ciphering keys. The USIM accordingly generates the keys per RFC 4187 and passes them back to adapter component, which transmits them to the authentication function. Appropriate authentication procedures as specified in 3GPP TS 33.234 are then performed. If the IPSec authentication function requests storage/writing of the ciphering keys, the adapter component handles the request accordingly as described above in detail relative to USIM storage vs. NVM storage. Any retrieval/read request for the keys from the authentication keys is therefore also mediated by the adapter component based on where the keys have been stored.

As to authentication under the various contexts discussed above, the adapter component determines which new EF structures are available on the USIM application and applicable procedures are then effectuated. With respect to UTRAN authentication, if the $EF_{3GPPkeys}$ file is present, key generation according to 3GPP TS 33.102 is performed and the generated keys are stored as set forth above. With respect to EAP authentication, if the $EF_{EAP-AKA}$ file is present, the UE performs appropriate key generation for I-WLAN, GAN and non-3GPP access according to applicable 3GPP standards, e.g., 3GPP TS 33.234, 3GPP TS 43.318, 3GPP TS 44.318, or 3GPP TS 33.402. In general, when the UE device receives a challenge from the network per applicable procedure (GE-RAN/UTRAN, IPSec, etc.), the legacy authentication function in the ME is triggered which sends the authentication information to the adapter component layer which mediates the key generation and storage as described above.

Typically, a security mode control procedure is used by the network to set the security mode; i.e., the settings for integrity protection and encryption, including the algorithms to use. This information is not used when GA-RRC is the serving entity in the UE, but may be stored/written in the UE for possible future use after a handover from VoLGA Iu-mode to UTRAN during the same upper layer transaction (i.e., the UTRAN RRC layer becomes the serving entity during this upper layer transaction). The security mode control procedure, which may apply only for a UE in the GA-RRC-CONNECTED state, also proves that the UE identity that is authenticated to the VANC is the same as the UE identity authenticated to the core network.

In general, the VANC node initiates the security mode control procedure by sending a GA-RRC SECURITY MODE COMMAND message to the UE device. This message includes the IE "Selected Integrity Protection Algorithm", the IE "Selected Encryption Algorithm" (optional), and the IE "Random Number". The VANC selects the algorithms based on the permitted algorithms received from the CN and the UE security capabilities indicated in the IE "3G Security Capability" indicator received from the UE in the Generic Access-Resource Control (GA-RC) REGISTER REQUEST message. When the UE receives a valid GA-RRC SECURITY MODE COMMAND message, it is configured to perform the following security mode operations. If a USIM is present and considered valid and i) the file $EF_{3GKeys}$ is present on the USIM and contains the key set identifier (KSI) that an Integrity Key and Cipher Key are available for the CS domain, store the selected integrity protection algorithm and (if received) the selected encryption algorithm in the file $EF_{3Gkeys}$; or ii) the file $EF_{3GKeys}$ is not present on the USIM and the ME supports the file $EF_{3GKeys}$ and it contains the key set identifier (KSI) that an Integrity key and Cipher key are available for the CS domain, store the selected integrity protection algorithm and (if received) the selected encryption algorithm in the ME file $EF_{3GKeys}$.

Generally, the information may be preserved for possible future use after a handover from VoLGA Iu-mode to UTRAN during the same upper layer transaction. If handover from VoLGA Iu-mode to UTRAN occurs, encryption is enabled if the IE "Selected Encryption Algorithm" is present in the message and disabled otherwise. The UE device may also be configured to calculate a MAC (Message Authentication Code), which can be 12 octets in one implementation. The MAC may be calculated over the following data: RAND|IMSI, using "HMAC-SHA1-96" algorithm, as specified in RFC 2104 with the Integrity Key stored in the file $EF_{3GKeys}$ is present on the USIM. If the $EF_{3GKeys}$ is not present on the USIM and the ME supports the file $EF_{3GKeys}$ with the Integrity Key (IK) stored therein, the file $EF_{3GKeys}$ on the ME for the CS domain is used as the authentication key.

It will be recognized by one skilled in the art that in the formulas above, the "|" character denotes concatenation. RAND is the 16-octet random number received from the VANC in the GA-RRC SECURITY MODE COMMAND message and IMSI is the UE's International Mobile Subscriber Identity, which can be in the same format as defined for the Mobile Identity IE per 3GPP TS 24.008. That is, the IMSI can be provided as a variable-length sequence of digits in BCD format (e.g. the IMSI "123456789098765" is encoded as the following octets (in hexadecimal): "21 43 65 87 09 89 67 F5"), with network byte order being used. The Integrity Key can be the same Integrity Key that has been derived during the last authentication for the CS domain. When the appropriate action on the GA-RRC SECURITY MODE COMMAND message has been taken, the UE device sends a GA-RRC SECURITY MODE COMPLETE message to the VANC. The UE includes the calculated MAC value in the IE "Ciphering Command MAC".

FIG. 9 depicts an example $EF_{UST}$ structure 900 according to an embodiment of the present disclosure. As alluded to previously, this EF is operable to indicate which services are available. If a service is not indicated as available in the EF of the USIM application, the ME will not select that service. Services, which are identified in service numbers (e.g., service no. 1 to service no. 8), may be indicated as either mandatory or optional. For example, service no. 1 may identify a Local Phone Book service, service no. 2 may identify a Fixed Dialing Numbers (FDN) service, etc. Additional values may be defined in the $EF_{UST}$ structure 900 to identify available new EF files described in the foregoing that are managed by the adapter functionality with respect to key storage.

Figure 10A:
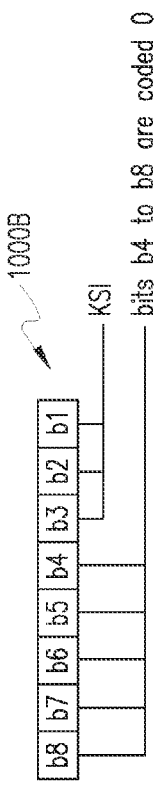
FIGS. 10A-10C depict example EF structures according to further embodiments of the present disclosure.
Figure 10B:
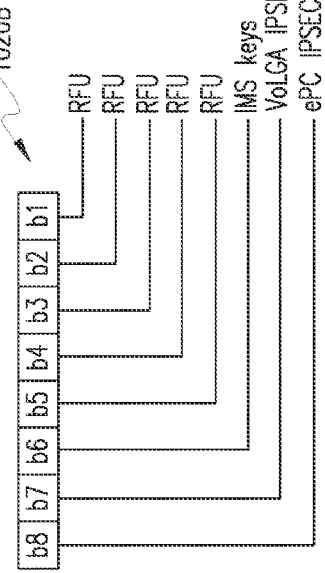
Figure 10C:
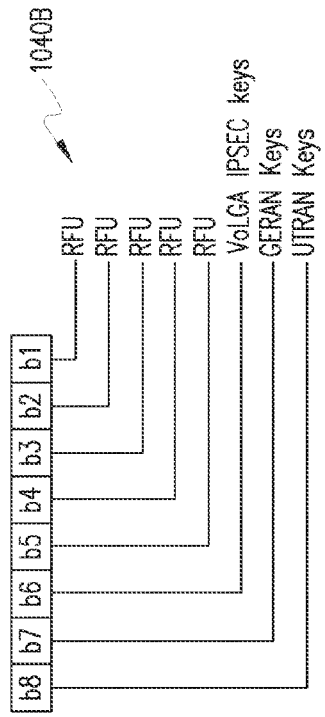

FIGS. 10A-10C depict example EF structures according to further embodiments of the present disclosure. Reference numeral 1000A refers generally to an example $EF_{3GPPKEYS}$ structure (also sometimes shown as $EF_{3Gkeys}$) that contains the Ciphering Key $C_k$ and Integrity Key $I_k$ as well as the Key Set Identifier (KSI) used by the UE device when it authenticates with an MSC. Reference numeral 1000B refers to a coding scheme for the KSI byte where bits [b3:b1] are used for the KSI and the remaining bits are set to 0. The Ciphering Key as well as the Integrity Key may also be encoded in some suitable fashion.

FIG. 10B depicts an example $EF_{EAP-AKAKEYS}$ structure 1020A (also sometimes shown as $EF_{EAP-AKA}$ or $EF_{EAP-AKAkeys}$) that contains the Ciphering Key $C_k$ and Integrity Key $I_k$ as well as the KSI used by the UE device when it authenticates with a network node under applicable EAP-AKA procedures. It should be recognized that such a network node can be, but not limited to, GANC, VANC, PDG, ePDG, AAA, S-CSCF, ANDSF, etc. Reference numeral 1020B refers to a coding scheme for the KSI byte where bits [b8:b6] are used for identifying ePC IPSec keys, VoLGA IPSec keys and IP Multimedia Subsystem (IMS) keys, respectively. As before, the Ciphering Key as well as the Integrity Key may also be encoded in some suitable fashion.

FIG. 10C depicts an example $EF_{VoLGAKEYS}$ structure 1040A (also sometimes shown as $EF_{VoLGAKeys}$) that contains the Ciphering Key $C_k$ and Integrity Key $I_k$ as well as the KSI used by the UE device when it authenticates with an MSC. This EF structure can also contain a combination of keys such as VoLGA IPSec keys, GERAN keys and UTRAN keys, as illustrated in an exemplary KSI coding scheme 1040B.

Those skilled in the art will recognize upon reference hereto that although the foregoing discussion of the adapter functionality primarily relates to mediating key generation and key storage management in a variety of security/authentication contexts (e.g., LTE, GERAN/UTRAN, WLAN/GAN, WiMAX), the functionality could equally be applied to other situations where there is overlap of data (i.e., collision) received across different RATs for the same type of variables, parameters or other information. For example, information such as emergency numbers may be received over two or more different RATs that needs to be managed so that there is no corruption of the data received via one RAT because of the data received via the other RAT(s). By way of illustration, FIGS. 11A and 11B depict example message structures in two different RATs wherein identical information regarding certain data is transmitted. Reference numeral 1100A refers to an example ATTACH ACCEPT message content received via LTE access. As shown, an Equivalent PLMN list and an Emergency Number list (reference numeral 1102A) are received in this message. In FIG. 11B, reference numeral 1100B refers to an example content of a LOCATION UPDATING ACCEPT message received via GERAN/UTRAN access. This message also carries an Equivalent PLMN list and an Emergency Number list (reference numeral 1102B). To avoid data collision and/or corruption, the adapter component 518 of a UE device (see FIG. 5) may be employed in accordance with the embodiments set forth herein.

Figure 12:
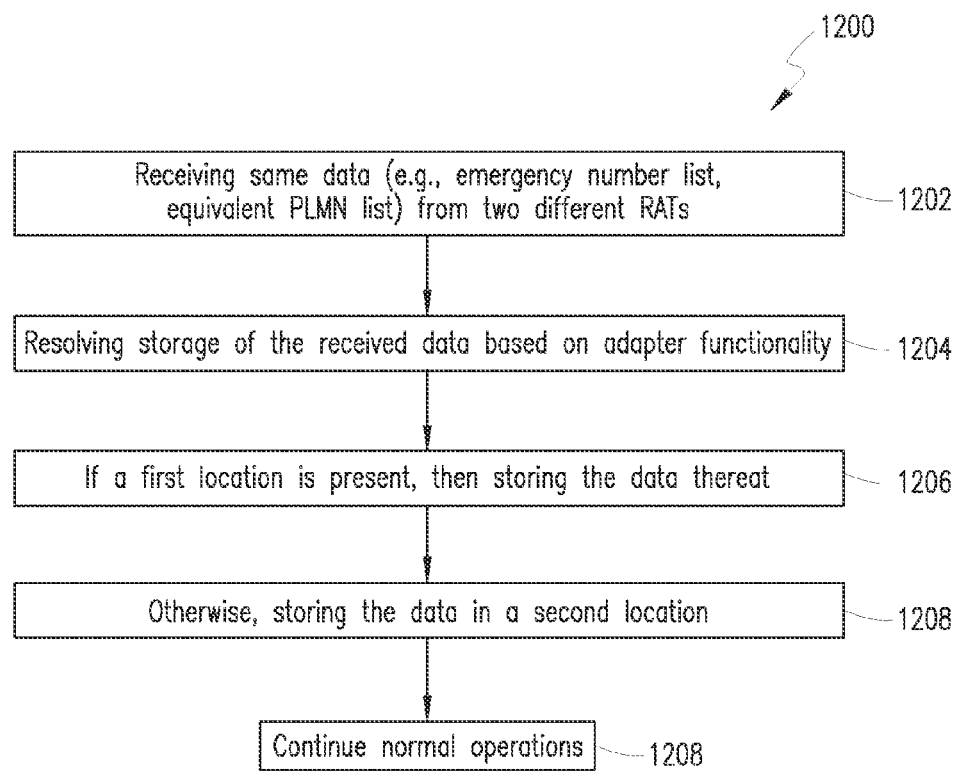
FIG. 12 depicts an example method for managing storage of common data received in different access technologies according to an embodiment of the present disclosure.

By way of an example, FIG. 12 depicts an embodiment of a method 1200 for managing storage of common data received in different RATs. When same data is received via two or more different technologies (block 1202), the adapter component is operable as a mediator with respect to the reception and storage of such data by resolving whether and/or where applicable storage files are provided (block 1204). For example, if a first location that is initially interrogated by the adapter component is present, the data received via a particular RAT may be stored thereat (block 1206). Otherwise, the data may be stored in a second location (block 1208). The data received via the second RAT may be stored in the location that has not already been occupied. In other words, the locations are managed as complementary; in that if a file for data received via one RAT is provided at one location, a second file is provided for data received via the other RAT at a complementary location. Alternatively, where a composite file structure is provided, such common data may be stored therein without collision with appropriate tagging and partitioning.

Figure 13:
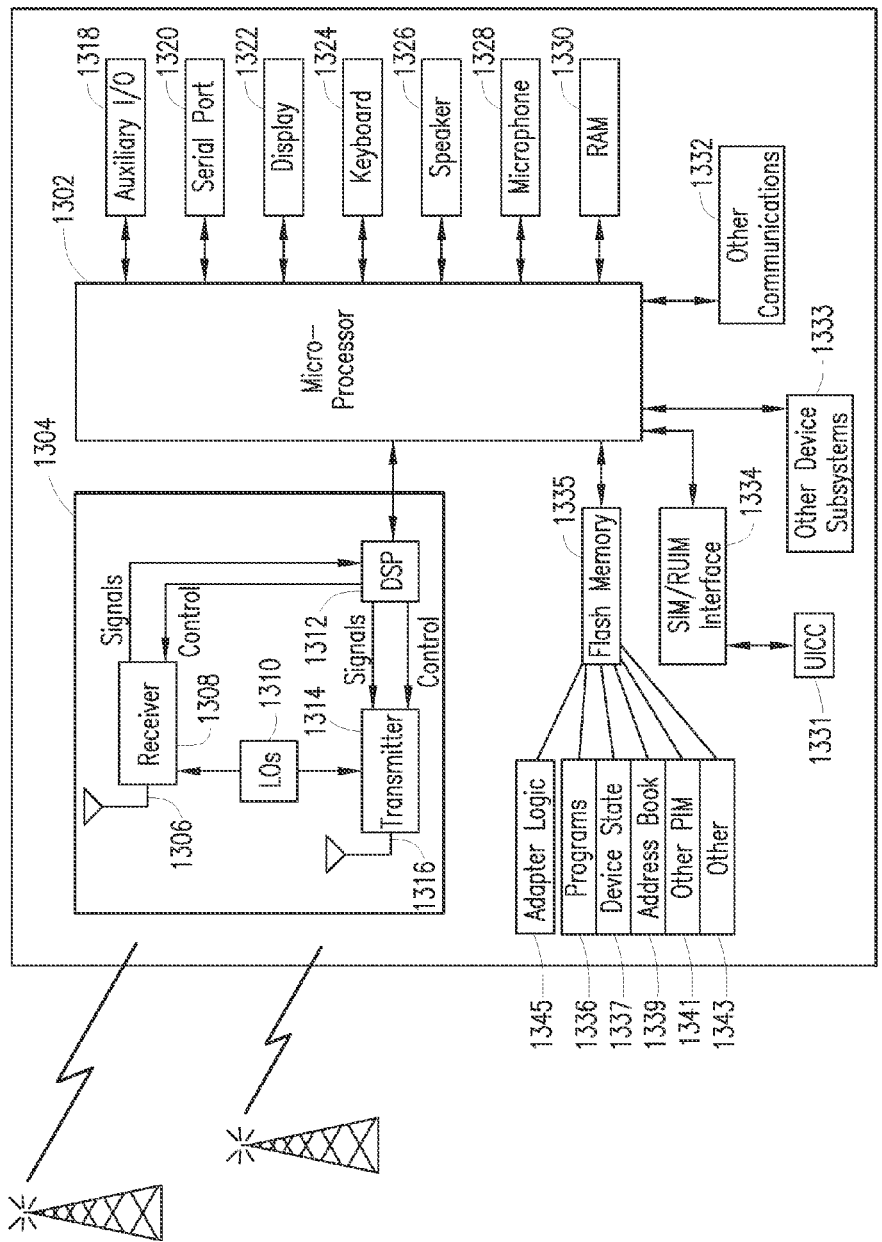
FIG. 13 depicts a block diagram of an example mobile communications device (i.e., a UE device comprising an ME portion and a removable module) according to one embodiment.

FIG. 13 depicts a block diagram of an example mobile communications device (e.g., UE device 202 including an ME as well a removable module) according to one embodiment that includes appropriate adapter functionality to manage or otherwise mediate key generation and storage management as described hereinabove. A microprocessor 1302 providing for the overall control of the UE device is operably coupled to a multi-mode communication subsystem 1304, which includes appropriate receivers 1308 and transmitters 1314 as well as associated components such as antennas 1306, 1316, one or more local oscillator (LO) modules 1310 and processing modules such as digital signal processors (DSP) 1312, for operating with multiple access types. As will be apparent to those skilled in the field of communications, the particular design of the communication module 1304 may be dependent upon the communications network(s) with which the UE device is intended to operate.

Microprocessor 1302 also interfaces with further device subsystems such as auxiliary input/output (I/O) 1318, serial port 1320, display 1322, keyboard 1324, speaker 1326, microphone 1328, random access memory (RAM) 1330, other communications facilities 1332, which may include for example a short-range communications subsystem, and any other device subsystems generally labeled as reference numeral 1333. To support access as well as authentication and key generation, a SIM/USIM interface 1334 (also generalized as a Removable User Identity Module (RUIM) interface) is also provided in communication with the microprocessor 1302 and a UICC 1331 having suitable SIM/USIM applications.

Operating system software and transport stack software may be embodied in a persistent storage module 1335 (i.e., non-volatile storage) which may be implemented using Flash memory or another appropriate memory. In one implementation; persistent storage module 1335 may be segregated into different areas, e.g., storage area for computer programs 1336 (which may include operation system software and a transport stack), as well as data storage regions such as device state 1337, address book 1339, other personal information manager (PIM) data 1341, and other data storage areas generally labeled as reference numeral 1343. Additionally, the persistent memory may include an adapter module 1345 for mediating authentication key generation and storage management according to the teachings set forth hereinabove.

Figure 14A:
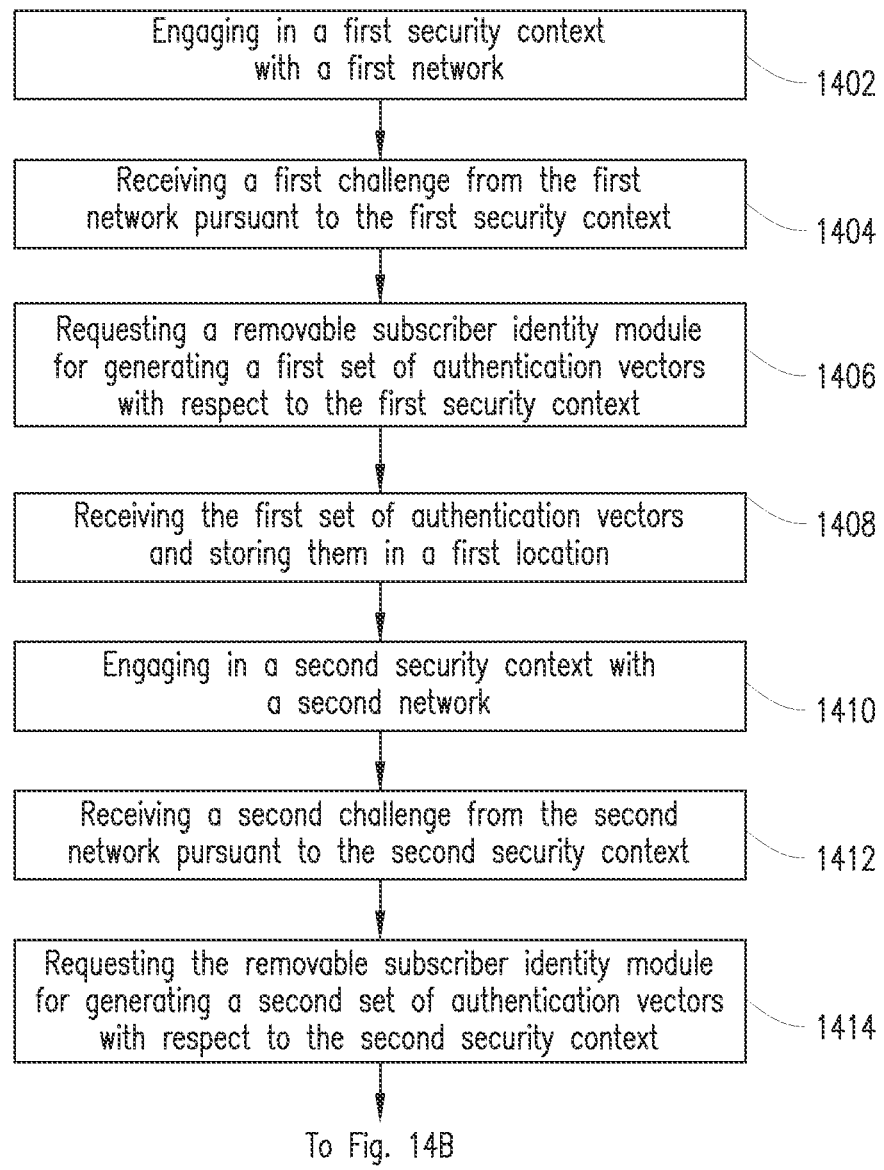
FIGS. 14A and 14B depict a flow chart of an example multiple security context management method according to an embodiment of the present patent disclosure.
Figure 14B:
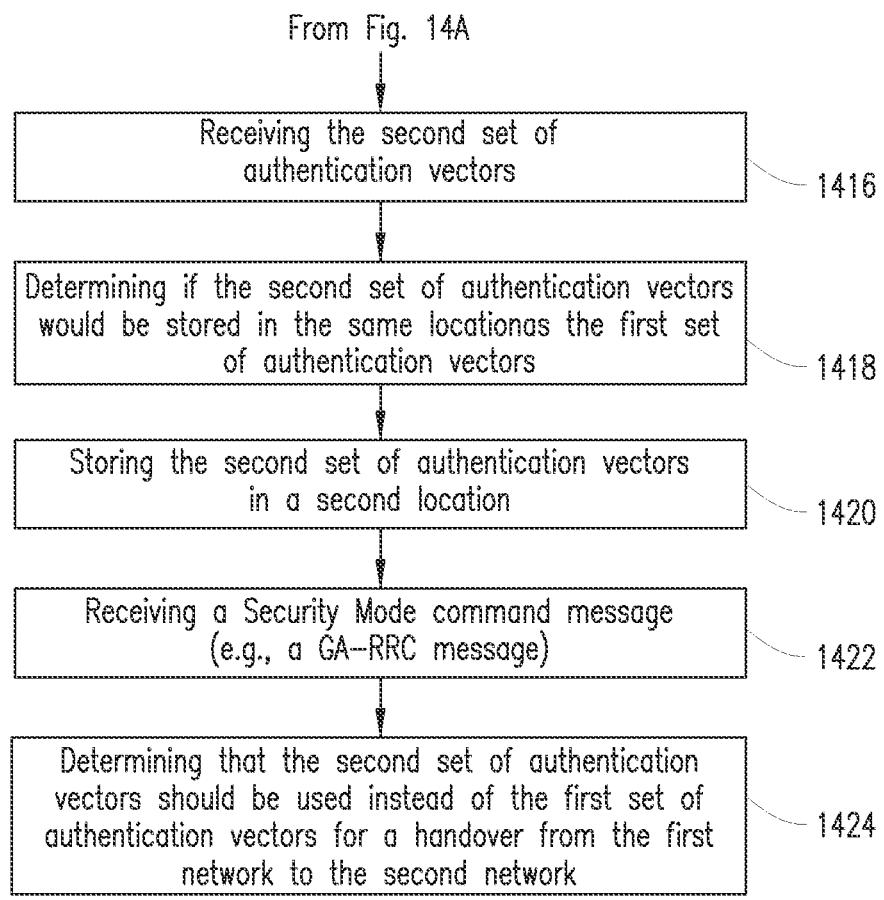

Referring now to FIGS. 14A and 14B, depicted therein is a flow chart of an example multiple security context management method according to an embodiment of the present patent disclosure in view of the foregoing description. The embodiment illustrated in FIGS. 14A and 14B is exemplary of a scenario where a mobile equipment is involved in two or more security contexts and interrogates a removable memory such as but not limited to, e.g., (U)SIM embodiments described above, with regard to the various authentication procedures involved therein. Further, as set forth above in detail, multiple sets of authentication vectors (also referred to as cipher keys, encryption keys, authentication keys, and the like) that are generated by the removable SIM may interfere with one another and the adapter layer functionality is invoked in resolving such issues.

As illustrated, the ME engages in a first security context with a first network (block 1402) that could be but not limited to LTE, WiMAX, CDMA2000, GERAN, UTRAN, IEEE 802.11a, b, g, n, etc., whereupon the authentication function of the ME is operable to receive a first challenge from the first network pursuant to the first security context (block 1404). The ME then requests a security function/authentication vector generator such as one on a removable (U)SIM for generating a first set of authentication vectors with respect to the first security context (block 1406). The ME receives the first set of authentication vectors provided by the (U)SIM and stores them in a first location (block 1408). The ME thereafter engages in a second security context with a second network that could be but not limited to LTE, WiMAX, CDMA2000, GERAN, UTRAN, IEEE 802.11a, b, g, n, etc., whereupon it receives a second challenge from the second network pursuant to the second security context (blocks 1410 and 1412). As a result, the ME requests the (U)SIM for generating a second set of authentication vectors with respect to the second security context (block 1414). When the second set of authentication vectors are received by the ME, the adapter component therein is configured to make a determination if the second set of authentication vectors would be stored in the same location as the first set of authentication vectors, i.e., potential interference (blocks 1416 and 1418). The adapter component then facilitates storing the second set of authentication vectors in a second location (block 1420). When a Security Mode command message (e.g., a GA-RRC message etc.) is received from a network node coupled to the second network (such as, e.g., the VANC, GANG etc.), a determination is made that the second set of authentication vectors should be used instead of the first set of authentication vectors for a handover from the first network to the second network (blocks 1422 and 1424). By way of example, the determination of block 1424 can be that the second set of authentication vectors should be used for a VoLGA to UTRAN mode handover. As a further implementation, the determination of block 1424 can be that the second set of authentication vectors should be used when accessing services e.g., Teleservices etc., of the second network over the first network is to be switched over to the second network (i.e., "native" access).

It should be recognized that the various processes, structures, components and functions set forth above in detail, whether associated with a UE device or a network node, may be embodied in software, firmware, hardware, or in any combination thereof, and may accordingly comprise suitable computer-implemented methods, modules, apparatuses or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

Furthermore, the arrangements set forth in the Figures of the present application may comprise a number of variations and modifications, in hardware, software, firmware, or in any combination, usually in association with a processing system where needed, as components configured to perform specific functions. Accordingly, the arrangements of the Figures should be taken as illustrative rather than limiting with respect to the embodiments of the present patent application.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A multiple security context management method for use on a mobile equipment, said method comprising:
   responsive to receiving a first challenge from a first, packet-switched, network pursuant to a first security context requesting a removable subscriber identity module (SIM) for generating a first set of authentication vectors with respect to said first security context, receiving said first set of authentication vectors and storing said first set of authentication vectors in a first location on one of said mobile equipment and said subscriber identity module, said first location being associated with said first security context;
   responsive to receiving a second challenge from a second, circuit-switched, network pursuant to a second security context in order to receive circuit-switched services via said first network, requesting said removable subscriber identity module for generating a second set of authentication vectors with respect to said security context, receiving said second set of authentication vectors and storing said second set of authentication vectors in a second location on one of said mobile equipment and said subscriber identity module, said second location being associated with said second security context; and
   responsive to preparation for transferring access for said mobile equipment from said first network to said second network, receiving a security mode command message from a network node coupled to said second network and determining that said second set of authentication vectors should be used instead of said first set of authentication vectors for handover from said first network to said second network.

2. The method of claim 1, wherein said first security context is one of a Long Term Evolution (LTE) Enhanced Packet Core (EPC) context and an IP Security Tunnel context.

3. The method of claim 1, wherein said second security context is a GERAN/UTRAN security context.

4. The method of claim 1, wherein said first location is provided on said removable SIM.

5. The method of claim 1, wherein said first location is provided as a memory integrated within said mobile equipment.

6. The method of claim 1, wherein said second location is provided on said removable SIM.

7. The method of claim 1, wherein said second location is provided as a memory integrated within said mobile equipment.

8. The method of claim 1, wherein said determining that said second set of authentication vectors should be used instead of said first set of authentication vectors is for a VoLGA to UTRAN handover.

9. The method of claim 1, wherein said determining that said second set of authentication vectors should be used instead of said first set of authentication vectors is performed when accessing Teleservices of said second network over said first network is to be switched over to accessing said Teleservices over said second network.

10. A mobile equipment, comprising:
    a micro-processor operably coupled to a communication subsystem and to a memory containing instructions that when executed by the micro-processor perform the following:
    responsive to receiving a first challenge from a first, packet-switched, network pursuant to a first security context, requesting a removable subscriber identity module (SIM) for generating a first set of authentication vectors with respect to said first security context, receiving said first set of authentication vectors and storing said first set of authentication vectors in a first location on one of said mobile equipment and said subscriber identity module, said first location being associated with said first security context;
    responsive to receiving a second challenge from a second, circuit-switched, network pursuant to a second security context in order to receive circuit-switched services via said first network, requesting said removable subscriber identity module for generating a second set of authentication vectors with respect to said security context, receiving said second set of authentication vectors, and storing said second set of authentication vectors in a second location on one of said mobile equipment and said subscriber identity module, said second location being associated with said second security context; and
    responsive to preparation for transferring access for said mobile equipment from said first network to said second network, receiving a security mode command message from a network node coupled to said second network and determining that said second set of authentication vectors should be used instead of said first set of authentication vectors for handover from said first network to said second network.

11. The mobile equipment of claim 10, wherein said first security context is one of a Long Term Evolution (LTE) Enhanced Packet Core (EPC) context and an IP Security Tunnel context.

12. The mobile equipment of claim 10, wherein said second security context is a GERAN/UTRAN security context.

13. The mobile equipment of claim 10, wherein said first location is provided on said removable SIM.

14. The mobile equipment of claim 10, wherein said first location is provided as a memory integrated within said mobile equipment.

15. The mobile equipment of claim 10, wherein said second location is provided on said removable SIM.

16. The mobile equipment of claim 10, wherein said second location is provided as a memory integrated within said mobile equipment.

17. The mobile equipment of claim 10, wherein said determining that said second set of authentication vectors should be used instead of said first set of authentication vectors is for a VoLGA to UTRAN handover.

18. The mobile equipment of claim 10, wherein said determining that said second set of authentication vectors should be used instead of said first set of authentication vectors is performed when accessing Teleservices of said second network over said first network is to be switched over to accessing said Teleservices over said second network.

19. A user equipment (UE) device, comprising:
a micro-processor operably coupled to a communication subsystem and to a memory containing instructions that when executed by the micro-processor perform the following:
generating one or more authentication keys for authentication of said UE device in a particular security context with a network node, said particular security context relating to one of a legacy circuit-switched context and an IPSec Tunnel context; and
determining whether a subscriber identity module (SIM) attached to said UE device contains an elementary file (EF) structure for said particular security context, facilitating storage of said authentication keys in said SIM when an elementary file (EF) structure for said particular security context is available in said SIM, and facilitating storage of said authentication keys in a nonvolatile memory (NVM) of said UE device when said EF structure is not found in said SIM.

20. The US device of claim 19, wherein said particular security context is a Long Term Evolution (LTE) Enhanced Packet Core (EPC) context and said network node comprises a Mobile Management Entity (MME) node.

21. The UE device of claim 19, wherein said particular security context is an IP Security Tunnel context established for accessing a circuit-switched service and said network node comprises a generic access network controller (GANC).

22. The UE device of claim 21, wherein said circuit-switched service is a voice service over LTE via Generic Access (VoLGA) and said GANC comprises a VoLGA access network controller (VANC).

23. The UE device of claim 19, wherein said particular security context is a GSM/EDGE Radio Access Network (GERAN) context accessed via a packet-switched network and said network node comprises a GSM-compliant mobile switching center (MSC) serving said UE device.

24. The UE device of claim 19, wherein said particular security context is a Universal Mobile Telecommunications System (UMTS) Terrestrial Radio Access Network (UTRAN) context accessed via a packet-switched network and said network node comprises a UMTS-compliant mobile switching center (MSC) serving said UE device.

25. The UE device of claim 19, wherein said one or more authentication keys comprise at least one of a UTRAN Ciphering Key (Ck), an Integrity Key (Ik), a GSM Ciphering Key (Kc) and an Access Security Management Entity (ASME) Key (KASME).

26. The UE device of claim 19, wherein said EF structure is adapted to contain keys for multiple security contexts.

27. The UE device of claim 26, wherein said multiple security contexts comprise an LTE EPC context, an IP Secure Tunnel context, a GERAN context and a UTRAN context.

28. The UE device of claim 19, wherein said instructions when executed by said microprocessor further perform interrogating said SIM responsive to one or more authentication inputs depending on access technologies used by said UE device.

* * * * *